United States Patent [19]
Greene

[11] Patent Number: 4,946,149
[45] Date of Patent: Aug. 7, 1990

[54] PROGRAMMABLE BED FOR MACHINE TOOLS AND THE LIKE

[75] Inventor: David G. Greene, Arden, N.C.

[73] Assignee: Steelcase, Inc., Grand Rapids, Mich.

[21] Appl. No.: 407,534

[22] Filed: Sep. 15, 1989

Related U.S. Application Data

[63] Continuation of Ser. No. 128,493, Dec. 3, 1987, Pat. No. 4,880,218.

[51] Int. Cl.$^5$ .............................................. B25B 11/00
[52] U.S. Cl. ........................................ 269/21; 83/451; 83/468.2; 144/2 R; 144/134 R; 144/286 A; 144/356; 269/303; 269/315
[58] Field of Search ............... 83/451, 468.2; 144/2 R, 144/134 R, 136 R, 134 A, 356, 357, 286 R, 286 A; 269/21, 303, 315

[56] References Cited

U.S. PATENT DOCUMENTS

| | | | |
|---|---|---|---|
| 4,011,779 | 3/1977 | Berg | 83/71 |
| 4,170,911 | 10/1979 | Ayers et al. | 83/467 X |
| 4,223,708 | 9/1980 | Paris, Jr. et al. | 83/467 X |
| 4,238,718 | 12/1980 | Wepner et al. | 83/467 X |
| 4,696,210 | 9/1987 | Cain et al. | 83/451 |
| 4,723,766 | 2/1988 | Beeding | 269/21 |

OTHER PUBLICATIONS

"System Eliminates Fixtures on CNC Routers," Furniture Design & Manufacturing, p. 42, 11/1988.

*Primary Examiner*—W. Donald Bray
*Attorney, Agent, or Firm*—Price, Heneveld, Cooper, DeWitt & Litton

[57] ABSTRACT

A programmable bed is provided for machine tools and the like, such as routers, boring tools, and other powered cutters and shapers. The programmable bed has a platen shaped to support differently sized workpieces thereon, and includes a plurality of retractable stops slidably mounted in the platen. The stops are selectively and individually shifted vertically between extended and retracted positions in response to the identification of a particular workpiece, so as to automatically locate or index the same on the platen at a preselected position relative to the machine tool. A plurality of pop-up suction chucks are also slidably mounted in the platen, and are selectively communicated with a source of vacuum. The suction chucks are reciprocated vertically between a retracted disengaged position, and an extended engaged position abutting an adjacent surface of the workpiece, so as to securely retain the workpiece in its preselected position during the machining operation.

13 Claims, 2 Drawing Sheets

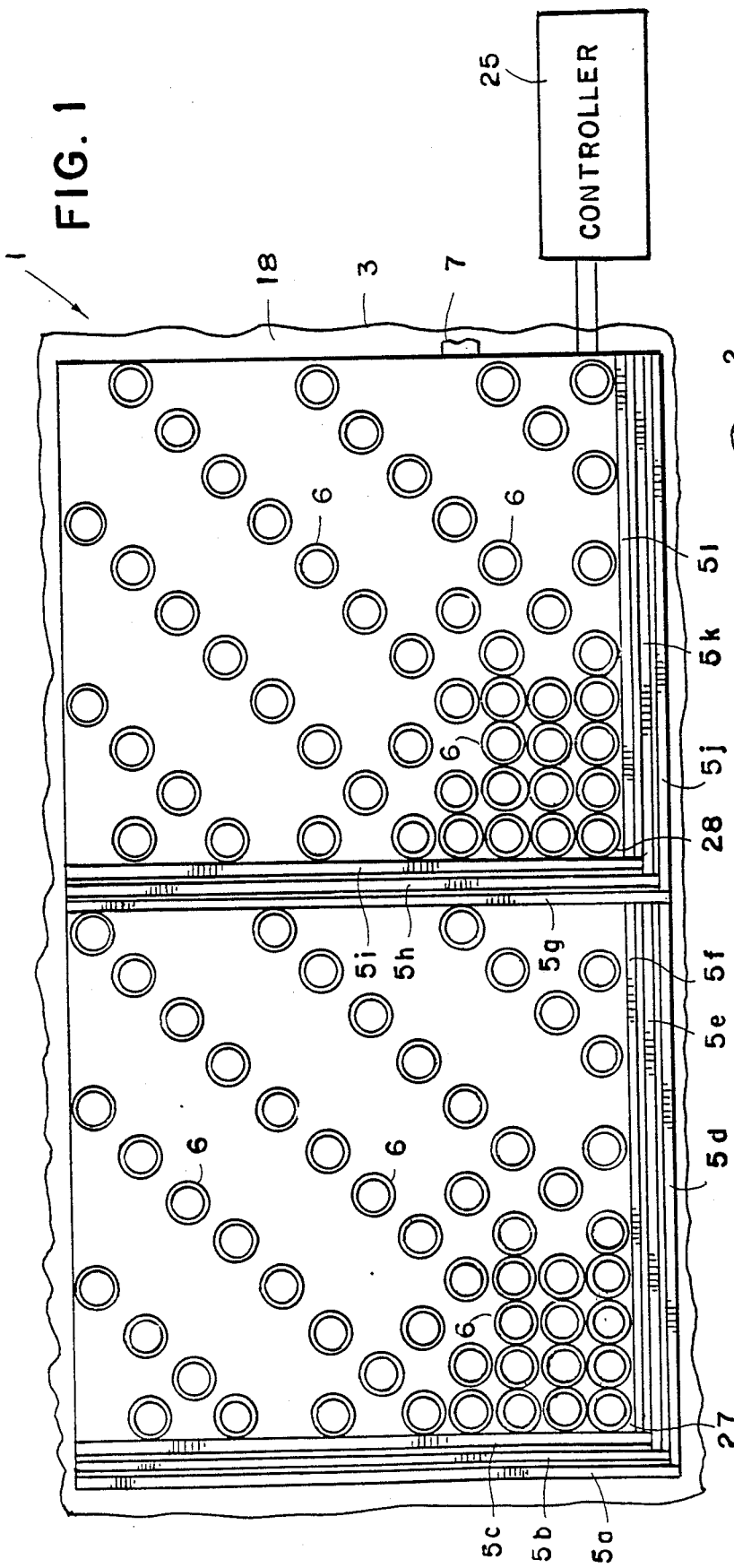
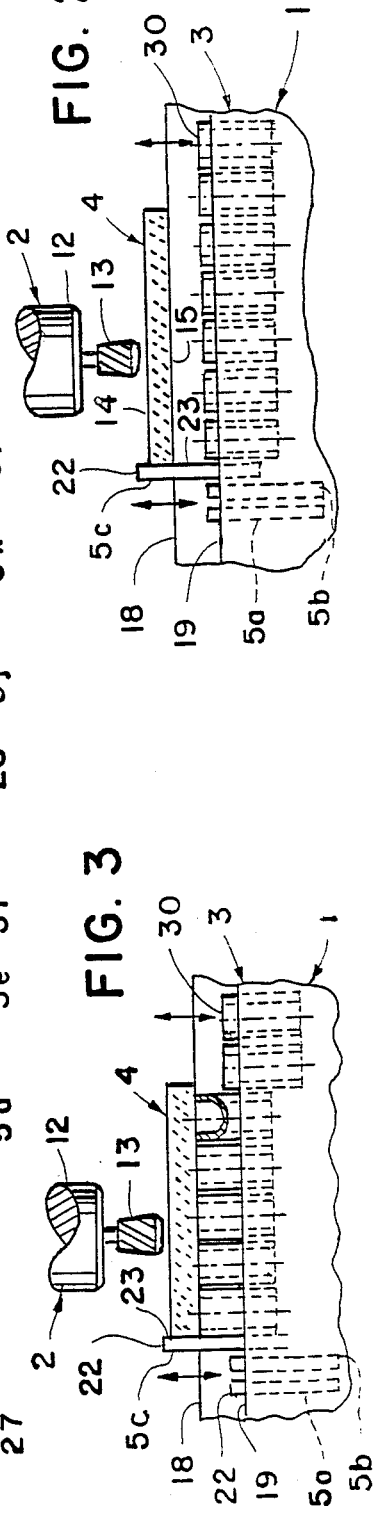

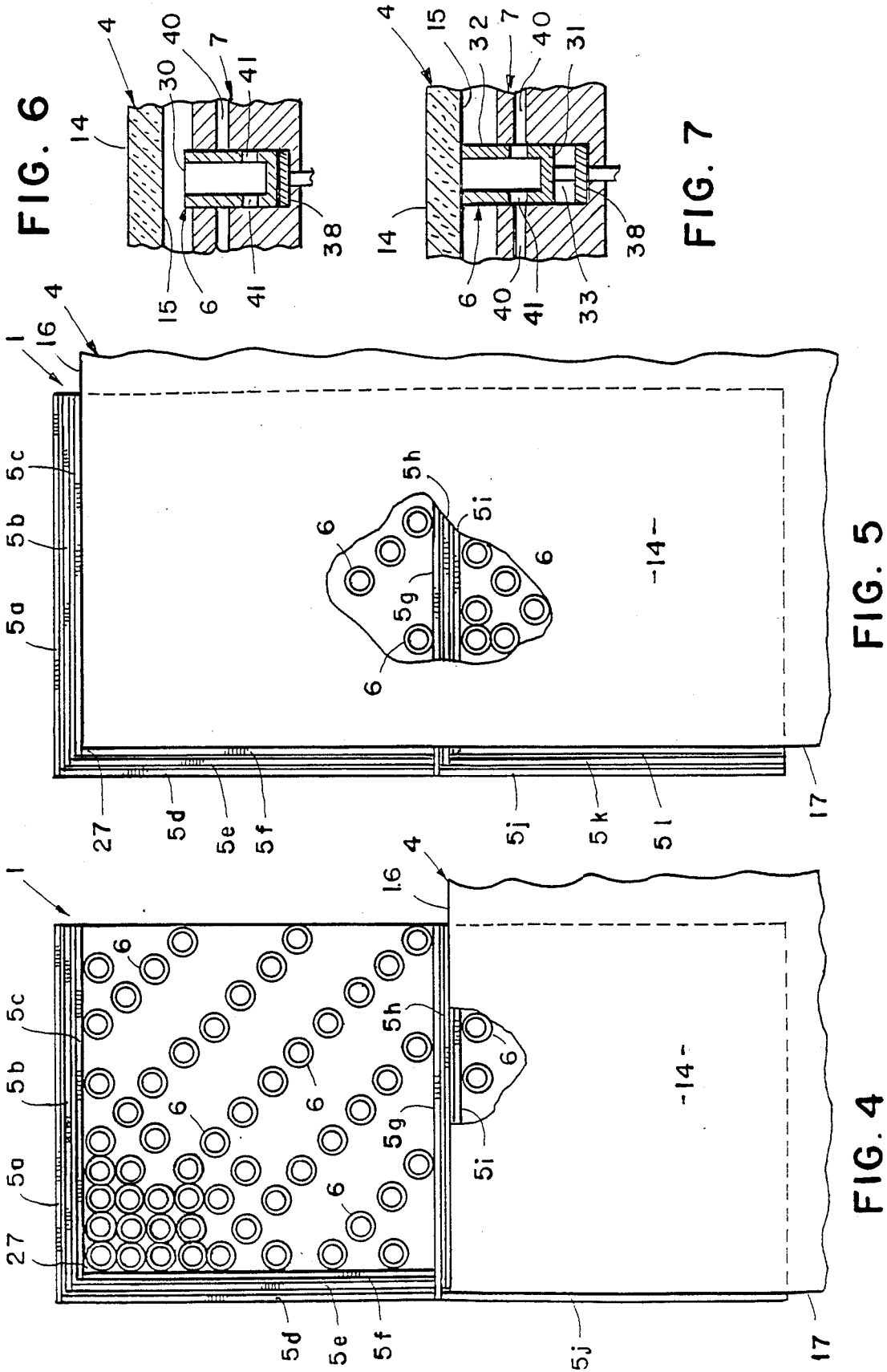

PROGRAMMABLE BED FOR MACHINE TOOLS AND THE LIKE

BACKGROUND OF THE INVENTION

The present invention relates to machine tools, and in particular to a programmable bed therefor.

Machine tools are used extensively to form and shape parts of all kinds. In the furniture industry, machine tools, such as routers, boring machines, and the like are used to shape edges, cut grooves, ribs, apertures, etc. and perform other similar machining operations in furniture substrate material including plywood and particle board.

Such routing and boring operations are now used so extensively that programmable machine tools have been developed to automatically form the individual furniture parts that are assembled into the final furniture article from blanks. Furniture articles such as desks, credenzas, case goods, work surfaces, computer stands, and the like are constructed in this manner.

Heretofore, a plurality of separate fixtures or jigs have been used to positively locate the blanks from which the parts are formed on the bed of the machine tool at a preselected location with respect to the automated machining head or heads of the tool. Typically, each individual furniture part requires its own fixture. This use of multiple fixtures results in substantial expense, effort and manufacturing time when producing furniture parts, particularly in the set up and tear down of the machine tool between sequential runs. Machine down time necessitated by fixture change-overs also adds to manufacturing expenses. These problems are particularly exacerbated when consumer demand for such products are only such as to justify low volume runs.

SUMMARY OF THE INVENTION

One aspect of the present invention is to provide a programmable bed for machine tools, and the like, which is capable of quickly and accurately indexing a plurality of differently sized and/or shaped parts on the machine bed, thereby eliminating the need for a multitude of individual part fixtures. The programmable bed includes a platen with a plurality of retractable stops, each of which has a retracted position wherein the stop is disposed wholly below the work surface of the platen to permit the workpiece to move freely thereover, and an extended position wherein at least a portion of the stop is disposed above the work surface to abut an associated one of the workpieces, and thereby locate the same at its preselected position. The stops are selectively and individually shifted between the extended and retracted positions in response to the identification of one of each differently sized workpieces to be machined, whereby differently sized workpiece is automatically indexed at its preselected position on the work surface of the platen to facilitate machining.

Another aspect of the present invention provides a suction hold-down mechanism that is capable of securely retaining a variety of differently sized and shaped workpieces in its preselected position on the work surface of the machine tool. The hold-down mechanism includes a plurality of pop-up suction chucks, which are slidably mounted in the platen, and are selectively communicated with a vacuum source. The suction chucks reciprocate between an extended, engaged position and a retracted, disengaged position with respect to the adjacent surface of the workpiece. The suction chucks are selectively and individually shifted between the engaged and disengaged positions in response to the identification of one of the differently sized workpieces to be machined, whereby each differently sized workpiece can be automatically retained at its preselected position on the work surface of the platen to facilitate machining. Preferably, only those suction chucks shifted to the extended engaged position are communicated with the vacuum source.

The principal objects of the present invention are to provide a programmable bed that automatically positions or indexes differently shaped and sized workpieces at their preselected position relative to the machine tool. The indexing is both accurate and quick to facilitate efficient manufacture. A suction hold-down mechanism provides a plurality of pop-up suction chucks which are individually activated to securely retain each particular workpiece in its preselected position on the bed. Preferably, both the stops and the suction chucks are programmed to be automatically activated in response to the identification of a particular part. The programmable bed provides more accurately formed parts, and reduces manufacturing time and expense. The programmable bed is efficient in use, economical to manufacture, capable of a long operating life, and particularly adapted for the proposed use.

These and other features, advantages, and objects of the present invention will be further understood and appreciated by those skilled in the art by reference to the following specification, claims and appended drawings.

BRIEF DESCRIPTION OF THE DRAWINGS

FIG. 1 is a partially schematic, top plan view of a programmable bed embodying the present invention.

FIG. 2 is a fragmentary, side elevational view of the programmable bed with a workpiece to be machined thereon, wherein a retractable stop portion of the bed is shown in an extended position, and pop-up suction chuck portions of the bed are shown in a retracted position.

FIG. 3 is a fragmentary, side elevational view of the programmable bed illustrated in FIG. 2, wherein selected ones of the suction chucks are shown in an extended position to engage and retain the workpiece in its preselected position on the bed.

FIG. 4 is a top plan view of the programmable bed, shown with a first workpiece indexed thereon at its preselected position beneath an associated machine tool, and a central portion thereof broken away to reveal the underlying programmable bed.

FIG. 5 is a top plan view of the programmable bed, shown with a second, differently sized workpiece indexed thereon at its preselected position beneath the machine tool, and a central portion thereof broken away to reveal the underlying programmable bed.

FIG. 6 is an enlarged fragmentary, vertical cross-sectional view of the programmable bed, showing one of the pop-up suction chucks in the retracted position.

FIG. 7 is an enlarged fragmentary, vertical cross-sectional view of the programmable bed similar to FIG. 6, but showing the suction chuck in the extended position.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a programmable bed embodying the present invention. Programmable bed 1 is particularly adapted for use in conjunction with machine tools and the like, such as boring tools, and the illustrated router 2. Programmable bed 1 includes a platen 3 shaped to support differently sized workpieces 4 thereon at selected locations relative to router 2. Programmable bed 1 includes a plurality of retractable stops 5 slidably mounted in platen 3. Stops 5 are selectively and individually shifted between extended and retracted positions in response to the identification of a particular workpiece 4 to automatically locate or index the same on platen 3 at its preselected position relative to router 2. Programmable bed 1 also includes a plurality of pop-up suction chucks 6, which are also slidably mounted in platen 3, and are selectively communicated with a source of vacuum 7. Suction chucks 6 are selectively reciprocated between a retracted, disengaged position on an extended, engaged position abutting an adjacent surface of workpiece 4 to securely retain workpiece 4 in its preselected position during machining.

In the illustrated example, router 2 comprises a computer aided machine tool, which includes a router head 12 mounted for translation above platen 3. The illustrated router 2 includes a router bit 13 designed to form grooves and other similar apertures in a wood based workpiece 4. Router head 12 is mounted in a conventional carriage assembly (not shown), that moves router head 13 in a preselected pattern over and through workpiece 4. Router head 12 is preferably associated with a computer, or other similar memory controller device 25, in which preselected router patterns are programmed to form a variety of differently sized and shaped workpieces 4.

Workpieces 4 are differently sized and shaped blanks from which articles, such as furniture parts, are formed by router 2. In the illustrated example, the workpiece blanks 4 are constructed from a high density particle board, or the like, and have a generally rectangular plan configuration, with upper and lower sides or faces 14 and 15, as well as end and side edges 16 and 17. Workpiece blanks 4 are shaped by router 2 to form desk tops, sides and back panels, credenza shelves and frames, work surfaces and drawers, and many other furniture parts. It is to be understood that programmable bed 1 is also adapted for use in conjunction with machining many other types and shapes of articles, as will be appreciated by those skilled in the art.

The platen 3 (FIGS. 1-3) of programmable bed 1 includes an upper work surface 18 designed to support a wide variety of the differently sized and shaped workpieces 4 thereon in a preselected spatial relationship with respect to router head 12 Platen 3 also has a mounting surface 19 spaced slightly below or recessed from work surface 18 for mounting stops 5 and suction chucks 6, as described in greater detail hereinafter.

The illustrated stops 5 (FIGS. 1-3) are slidably mounted in mating apertures or sockets through the mounting surface of platen 3, and are arranged in a selected pattern to quickly and conveniently index or positionly locate the workpieces 4 beneath router 2. In the illustrated example, programmable bed 1 includes two identical sets of six stops each 5a-5g and 5h-5l respectively. Each of the illustrated stops 5 is in the form of a plate, having a substantially rectangular upper edge or surface 22, as well as a flat, rectangular abutment surface 23 on the interior side of programmable bed 1. Each of the stops 5 has a lowered, retracted position, as exemplified by stops 5a and 5b in FIG. 3, wherein the stop 5 is disposed wholly below the work surface 18 of platen 3 to permit the workpieces 4 to move freely thereover. Stops 5 also have a raised, extended position, as exemplified by stop 5c in FIG. 3, wherein at least a portion of the stop is disposed above the work surface 18 of platen 3 to abut an associated workpiece 4, and thereby locate the same at its preselected position below router 2 on the work surface 18 of platen 3. In the example illustrated in FIG. 3, the upper surface 22 of stop 5c is disposed above the upper face 14 of workpiece 4, and the forward end edge 16 of workpiece 4 abuts surface 23 of stop 5c. Controller 25 selectively and individually shifts each of the stops 5 between the extended and retracted positions in response to identification of the differently sized workpiece 4 to be machined, as discussed below.

In the illustrated example, stops 5a-5c are angled or oriented substantially 90° from stops 5d-5f in the forward set of stops (left side of platen 3 as viewed in FIG. 1). In a similar fashion, stops 5g-5i are angled or oriented substantially 90° from stops 5j-5l in the rearward set of stops (right side of platen 3 as viewed in FIG. 1). In this manner, stops 5 locate the workpiece 4 both longitudinally and laterally on the work surface 18 of platen 3 by abutting the leading end edge 16 and outer side edge 17 of each workpiece 4. The distance between the forward and rearward sets of stops 5c-5f and 5j-5i respectively can be varied in accordance with the type of workpieces 4 being machined on programmable bed 1.

Controller 25 comprises a conventional computing apparatus, and includes memory means for recording the dimensions and shapes of each of the differently sized workpieces 4 and associated blanks to be machined. In this manner, before a workpiece blank 4 is positioned on programmable bed 1, its part number, or other similar identification, is entered into controller 25, which in turn selectively extends and retracts stops 5 in a manner which will automatically locate or index the workpiece blank 4 in its proper position beneath router 2.

Pop-up suction chucks 6 (FIG. 1) are also slidably mounted in platen 3, and provide a mechanism for securely retaining the workpieces 4 in their preselected position on the work surface 18 of platen 3. Preferably, suction chucks 6 are arranged in two, substantially identical groups, with the forward group disposed generally between stops 5c & 5f, and the rearward group disposed generally between stops 5i & 5l. Each of the illustrated groups includes fifty-four stops 5 arranged in a pattern which fans outwardly from the respective corners 27 and 28 defined by adjacent portions of stops 5c & 5f and 5i & 5l respectively. As viewed in FIG. 1, in each group of suction chucks 5, the first fifteen suction chucks 5 adjacent the associated one of corners 27 and 28 are spaced closely together in a side-by-side and aligned manner to provide maximum hold-down at the corners 27 and 28. The remaining suction chucks 5 in each group are scattered further apart in a definite pattern that includes five linear rows disposed approximately 45° from the opposite sets of stops 5a–5c & 5d–5f and 5g–5i & 5j–5l, with the rows spaced apart perpendicularly from one another. These additional suction chucks 5 are located a substantial distance from corners 27 and 28 to resist any torques that might be applied to the workpiece blanks 4.

In the illustrated example, suction chucks 6 (FIGS. 4–7) each have a generally cylindrical configuration, comprising an annularly shaped upper surface 30, a closed lower end 31, and a cylindrical sidewall 32. Each suction chuck 6 is closely received in a mating, cylindrically shaped bore 33 disposed vertically in platen 3. Bores 33 are oriented so as to retain suction chucks 6 in a substantially perpendicular relationship with respect to the work surface 18 of platen 3.

As best illustrated in FIGS. 6 and 7, suction chucks 6 are selectively and individually reciprocated between the retracted, disengaged position illustrated in FIG. 6, and the extended, engaged position illustrated in FIG. 7, so as to selectively and securely retain the workpieces 4 on the work surface 18 of platen 3. Suction chucks 6 may be shifted between the extended and retracted positions by a number of different conventional mechanisms, such as mechanical lifts, hydraulic jacks, pneumatic power, or the illustrated electrical solenoids 38.

Preferably, each suction chuck 6 is communicated with vacuum source 7 only when the suction chuck 6 is in the extended position illustrated in FIG. 7. In this manner, maximum hold-down force is achieved In the illustrated example, vacuum source 7 is communicated with each suction chuck 6 by way of a header 40 provided in platen 3, and opposite suction ports 41 disposed through the sidewall 32 in each of the suction chucks 6. In the extended position illustrated in FIG. 7, suction ports 41 are aligned with header 40, so as to communicate vacuum source 7 with the interior of the suction chuck 6. The upper surface 30 of suction chuck 6 abuts and forms a seal against the lower face 15 of workpiece 4 to securely retain the workpiece in place. When the suction chuck 6 is shifted to the retracted position illustrated in FIG. 6, suction ports 41 are wholly disaligned with header 40, and are disposed below header 40, with the sidewall 32 of the suction chuck 6 sealing off the opposite ends of header 40. It is to be understood that other arrangements may be used to selectively communicate vacuum source 7 with suction chuck 6 only when the suction chuck 6 is in the extended, engaged position.

As previously noted, when suction chuck 6 is shifted to the extended position illustrated in FIG. 7, the upper surface 30 of suction chuck 6 engages and abuts the lower surface 15 of the associated workpiece 4 and forms a seal therebetween which causes vacuum source 7 to retain workpiece 4 in its preselected position on the work surface 18 of platen 3. In the retracted position illustrated in FIG. 7, the upper surface 30 of suction chuck 6 is spaced apart and disengaged from the lower surface 15 of workpiece 4 to permit the workpieces 4 to move freely over the work surface 18 of platen 3.

In the preferred embodiment of the present invention, controller 24 is an integrated mechanism, so that it not only operates stops 5, but also selectively and individually shifts suction chucks 6 between the extended and retracted positions in response to the identification of one of the differently sized workpieces 4 to be machined, whereby each of the differently sized workpieces can be automatically retained at their preselected position on the work surface 18 of platen 3 to facilitate machining.

In use, programmable bed 1 operates in the following manner, sequentially shifting stops 5 and suction chucks 6. The machine operator identifies the particular part to be machined, and enters the associated part number, or other similar code in controller 25. Controller 25 is thereby automatically programmed to selectively activate both stops 5 and suction chucks 6. The selected stops 5 are raised to their extended position, so as to laterally and longitudinally locate the workpiece blank 4 on the work surface 18 of platen 3. For example, in the arrangement illustrated in FIG. 4, when the part number for workpiece 4 is entered in controller 25, stops 5h and 5j are raised to the extended position, with the remaining stops 5a–5g, 5i–5k–l staying in the retracted position. The abutment surfaces 23 of stops 5h and 5j form the references or stops which abut the end and side edges 16 and 17 of the workpiece 4 to properly locate the same on platen 3. In the arrangement illustrated in FIG. 5, when the part number for a different sized workpiece 4 is entered in controller 25, stops 5l, 5f and 5c are raised to the extended position, with the remaining stops, 5a–5b, 5d–5e & 5g–5k staying in the retracted position. The abutment surfaces 23 of stops 5l, 5f and 5c form the references or stops which abut the end and side edges 16 and 17 of the workpiece 4 to properly locate this particular workpiece 4 on platen 3.

The machine operator then positions the proper workpiece blank 4 on the work surface 18 of platen 3, with the forward end edge 16 engaging the extended ones of stop 5a–5c or 5g–5a, and the side edge 17 engaging the extended ones of stop 5d–5f or 5j–5l, depending upon the particular part to be machined Once the workpiece blank 4 is positioned accurately against stops 5, pop-up suction chucks 6 are activated, such that only those suction chucks 6 disposed directly beneath the workpiece blank 4 are extended and engaged abuttingly against the lower face 15 of workpiece blank 4. Vacuum source 7 is thereby automatically communicated with the extended suction chucks 6, which securely retains the workpiece blank 4 on platen 3 in its preselected position beneath router 2. Router 2 is then activated, so that router head 12 moves in the preselected pattern to form the necessary grooves and/or other apertures in workpiece 4. After workpiece blank 4 has been routed, the suction applied through the extended suction chucks 6 is released, so that the formed part can be removed, and a new workpiece blank 4 positioned on programmable bed 1.

The multiple stops 5 of programmable bed 1 automatically index differently sized and shaped workpieces 4 on the work surface 18 of platen 3 to accurately locate the same beneath router 2. Pop-up suction chucks 6 are automatically extended where necessary to seal against the lower surface of the workpiece 4, and thereby securely retain the same in their preselected position during machining. Programmable bed 5 is thereby capable of quickly and accurately machining workpieces 4 in a fully automated fashion, with reduced effort and improved efficiency.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A programmable bed for machine tools and the like, comprising:
   a platen having a support surface adapted to uphold a variety of differently sized workpieces thereon adjacent an associated machine tool;
   means for selectively retaining each of the differently sized workpieces on the support surface of said platen at a preselected position to coordinate with the associated machine tool, including:
   first and second retractable stops mounted in said platen, and arranged in opposite angular orientations so as to locate the workpieces both longitudinally and laterally with respect to the associated machine tool; said first and second stops each having a retracted position wherein said stop is disposed below the support surface of said platen to permit the workpieces to move thereover, and an extended position wherein at least a portion of said stop is disposed above the support surface of said platen to abut an associated one of the workpieces, and thereby locate the same at the preselected position on the work surface of said platen;
   means for selectively and individually shifting said first and second stops between the extended and retracted positions in response to identification of one of the differently sized workpieces to be machined, whereby the differently sized workpieces can each be automatically indexed at their preselected position on the work surface of said platen to facilitate machining.

2. A programmable bed as set forth in claim 1, wherein:
   said workpiece retaining means comprises suction means operably mounted in said platen, and adapted to selectively communicate a source of vacuum with an adjacent surface of an associated one of the workpieces to securely retain the same in the preselected position.

3. A programmable bed as set forth in claim 2, wherein:
   said suction means comprises at least one pop-up suction chuck having one portion thereof adapted to abut the adjacent workpiece surface, and another portion thereof selectively communicating with the vacuum source; said suction chuck being slidably mounted in said platen for reciprocation between an extended position and a retracted position.

4. A programmable bed as set forth in claim 3, wherein:
   said suction means includes a plurality of said suction chucks operably mounted in said platen; and including
   means for selectively and individually shifting said suction chucks between the extended and retracted positions in response to identification of one of the differently sized workpieces.

5. A programmable bed as set forth in claim 4, including:
   means for communicating the vacuum source with only those suction chucks disposed in the extended position.

6. A programmable bed as set forth in claim 5, including:
   means for integrating said stop shifting means and said suction chuck shifting means, whereby both said stops and said suction chucks are sequentially shifted in response to identification of one of the differently sized workpieces for fully automated machining.

7. A programmable bed as set forth in claim 6, wherein:
   said first and second stops are oriented substantially 90° apart with adjacent portions thereof forming a corner therebetween.

8. A programmable bed as set forth in claim 7, wherein:
   said suction chucks are disposed between said first and second stops, and are arranged in a preselected pattern which fans outwardly from said corner.

9. A programmable bed as set forth in claim 8, including:
   memory means for recording the dimensions and shapes of each of the differently sized workpieces; and
   means for operatively interconnecting said memory means and said integrating means to automatically index each of the workpieces at their preselected position on the work surface of said platen, and securely retain the same therein during machining.

10. A programmable bed for machine tools and the like, comprising:
    a platen having a support surface adapted to uphold a variety of differently sized workpieces thereon adjacent an associated machine tool;
    means for selectively positioning each of the differently sized workpieces on the support surface of said platen at a preselected position to coordinate with the associated machine tool;
    means for selectively retaining each of the differently sized workpieces at their preselected position, comprising:
    a source of vacuum;
    a plurality of pop-up suction chucks operably mounted in said platen, and each having one portion thereof adapted to abut an adjacent surface of an associated one of the workpieces and another portion thereof selectively communicating with the vacuum source; said suction chucks each being slidably mounted in said platen for reciprocation between an extended position wherein the one portion of said suction chuck abuts the adjacent workpiece surface and forms a seal therebetween which causes the vacuum source to retain an associated one of the workpieces in its preselected position, and a retracted position wherein the workpieces may move freely over the support surface of said platen;
    means for selectively and individually shifting said suction chucks between the extended and retracted positions in response to identification of one of the differently sized workpieces to be machine, whereby each of the differently sized workpieces can be automatically retained at their preselected position on the support surface of said platen to facilitate machining.

11. A programmable bed as set forth in claim 10, including:

means for communicating the vacuum source with only those suction chucks disposed in the extended position, whereby each of the differently sized workpieces is securely retained at its preselected position on the work surface of said platen.

12. A programmable bed as set forth in claim 11, wherein:

said workpiece positioning means includes a first stop and a second stop which are oriented substantially 90° apart, with adjacent portions thereof forming a corner therebetween so as to locate the workpieces both longitudinally and laterally on the work surface of said platen.

13. A programmable bed as set forth in claim 12, wherein:

said suction chucks are disposed between said first and second stops, and are arranged in a preselected pattern which fans outwardly from said corner.

* * * * *